US008353032B1

(12) United States Patent
Satish et al.

(10) Patent No.: US 8,353,032 B1
(45) Date of Patent: Jan. 8, 2013

(54) METHOD AND SYSTEM FOR DETECTING IDENTITY THEFT OR UNAUTHORIZED ACCESS

(75) Inventors: Sourabh Satish, Fremont, CA (US); Brian Hernacki, San Carlos, CA (US); Govinda S. Salinas, Newark, CA (US)

(73) Assignee: Symantec Corporation, Mountain View, CA (US)

( * ) Notice: Subject to any disclaimer, the term of this patent is extended or adjusted under 35 U.S.C. 154(b) by 1353 days.

(21) Appl. No.: 11/823,877

(22) Filed: Jun. 29, 2007

(51) Int. Cl.
*H04L 29/06* (2006.01)
(52) U.S. Cl. .................. 726/22; 726/26; 726/27
(58) Field of Classification Search ............. 726/22, 726/26, 27
See application file for complete search history.

(56) References Cited

U.S. PATENT DOCUMENTS

| | | | | |
|---|---|---|---|---|
| 6,405,318 B1* | 6/2002 | Rowland | ............... | 726/22 |
| 7,367,063 B1* | 4/2008 | O'Toole, Jr. | ............... | 726/34 |
| 2005/0091513 A1* | 4/2005 | Mitomo et al. | ............... | 713/188 |
| 2006/0020634 A1* | 1/2006 | Huras et al. | ............... | 707/200 |
| 2007/0083938 A1* | 4/2007 | Aoki et al. | ............... | 726/30 |
| 2007/0198462 A1* | 8/2007 | Ohta et al. | ............... | 707/1 |
| 2007/0234409 A1* | 10/2007 | Eisen | ............... | 726/6 |
| 2007/0239606 A1* | 10/2007 | Eisen | ............... | 705/51 |

OTHER PUBLICATIONS

Infotrade: Infotrade launches world's first on-line finance network Portfolio On line & E-mail services available. Nov. 1, 1995, P. N/A, (Full Text) Gale Group Newsletter DB [online]. M2 Presswire. [Retrieved Aug. 18, 2010]. Retrieved from: Dialog LLC, 2250 Perimeter Park Drive, Morrisville, North Carolina 27560. Accession number: 02902520.*

* cited by examiner

*Primary Examiner* — Edan Orgad
*Assistant Examiner* — Bradley Holder
(74) *Attorney, Agent, or Firm* — Wilmer Cutler Pickering Hale and Dorr LLP

(57) ABSTRACT

A method and system for detecting an anomaly relating to resource access comprising logging in to a website using identity information, storing a current login time in an access time database, accessing a last local login time for the resource from the access time database, determining a last resource login time from the resource and comparing the last local login time to the last resource login time, wherein a result of the comparison indicates resource access anomaly.

20 Claims, 2 Drawing Sheets

METHOD AND SYSTEM FOR DETECTING IDENTITY THEFT OR UNAUTHORIZED ACCESS

BACKGROUND OF THE INVENTION

1. Field of the Invention

Embodiments of the present invention generally relate to a method and system for detecting anomalies relating to access of websites and, more particularly, to a method and system for detecting user identity information theft or unauthorized access of websites over a telecommunications network.

2. Description of the Related Art

Present day computer systems connect and exchange information extensively through telecommunications network, such as the Internet. These interactions involve many transactions that may require a user's identity information such as, for example, login information, passwords, social security information or other user credentials, to be disclosed. This user identity information is sometimes under threat from malicious agents that compromise the secrecy of a user's identity information and use the compromised information to assume the identity of the user and/or access the user's computer resources, e.g., on-line accounts, networks, computers, websites, and the like. Additionally, a user is susceptible to social attacks such as phishing attacks in which a phisher misguides a user to a fake website that looks substantially identical to a genuine website. Thereafter, the user is required to disclose his or her identity information to the phishing website. In this way, the user identity information is thus compromised and this information may then be used by the phisher for malicious or undesirable purposes.

Regardless of the mode, computer user identities are regularly stolen and maliciously misused. A user identity information thief typically uses the information for malicious purposes, such as, accessing on-line accounts to compromise additional information of the user and/or others, accessing restricted computer resources, submitting instructions on behalf of the user, outright stealing of money from on-line bank or brokerage accounts, and the like. The damage could include bad credit, invoices arriving for products a user has not purchased, misrepresentation of a user to send foul or inaccurate messages to a third person, among various others. In most case, the user does not realize their identity information is stolen until damage has been done.

Therefore, there exists a need for a method and system that determines if any anomalies have occurred that form indicia of identity information compromise.

SUMMARY OF THE INVENTION

Embodiments of the present invention include a method and system for detecting an access anomaly relating to resource access by a user. The method and system comprise logging in to a resource using identity information, storing a current login time in an access time database, accessing a last local login time for the resource from the access time database, determining a last resource login time from the resource and comparing the last local login time to the last website login time. Depending upon the outcome of the comparison, an anomalous access to the resource is detected.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described, herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including," and "includes" mean including, but not limited to. Further, the word "a" means "at least one", and the word "plurality" means one or more, unless otherwise mentioned. As used herein, the words "anomaly" and "anomalies" mean any unexpected or malicious activity including, for example, unauthorized website access, user identity phishing, among various others. As used herein, the words "log in", "logged in", "access", "accessing" and the like mean accessing a resource by providing and authenticating a user's identity information, where a resource may be any computer accessible entity requiring authorized access, including but not limited to applications, networks, computer hardware, websites, peripherals, and the like.

DETAILED DESCRIPTION

Figure 1:
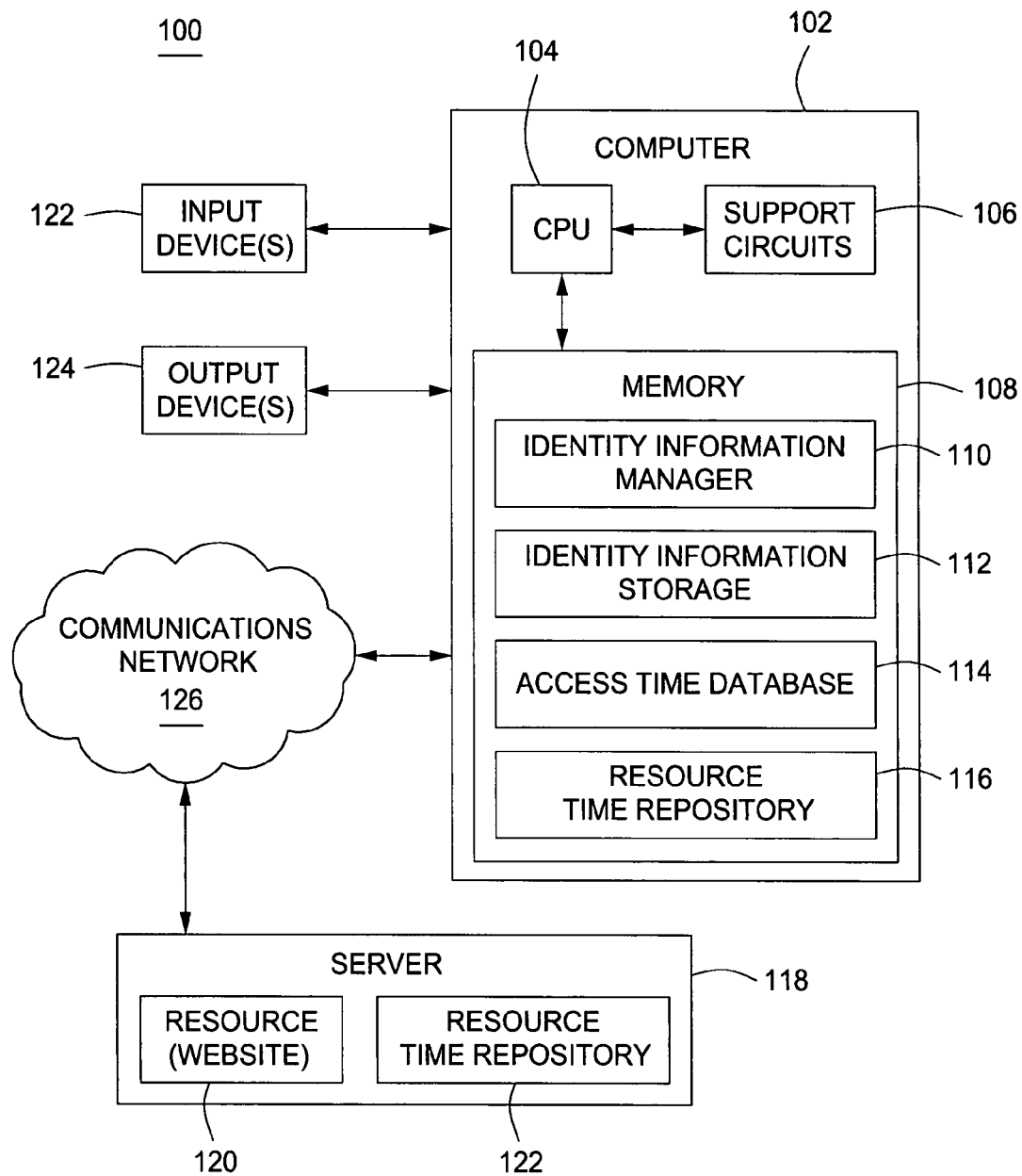
FIG. 1 is a block diagram of a computer system according various embodiments of the present invention.

FIG. 1 is a block diagram of a computer system 100 according various embodiments of the present invention. The computer system 100 comprises a user computer 102 running several applications and connected to a communication network 126 that generally forms a portion of the Internet which may comprise various sub-networks such as Ethernet networks, local area networks, wide area networks, wireless networks, and the like. The network 126 provides access to the computer 102 for various resources. Such resources may include websites, for example, a website 120 that is hosted on a server 118, comprising one or more web pages.

The server 118 may comprise information on the last time a particular user (identified by the user's identity information) accessed a server resource such as the web pages on the website 120. This information may be stored, for example, in a repository 122 on the server 118.

The computer 102 comprises, without limitation, input/output devices, such as an input device 122 and an output device 124, a CPU 104, support circuits 106, and a memory 108. The CPU 104 may be one or more of any commercially available microprocessors or microcontrollers. The support circuits 106 comprise circuits and devices that are used in support of the operation of the CPU 104. For example, the input device 122, the output device 124, the CPU 104, and the memory 108 are inter-connected through the support circuits 106. Such support circuits include, for example, one or more of cache, input/output circuits, system bus, PCI bus, clock circuits, power supplies or the like. Those skilled in the art will appreciate that the hardware depicted in the FIG. 1 may vary from one computer system to another. For example, other peripheral devices, such as optical disk drives, graphics card, data storage devices, various other input devices, peripherals and the like, may also be used in addition to or in place of the hardware depicted.

The memory 108 may comprise random access memory, read only memory, optical memory, disk drives, removable memory, and the like. Various types of software processes or modules and information are resident within the memory 108. For example, various processes such as an Operating System (OS) kernel (not shown), a software library (not shown), and software modules, for example, modules 110, 112, 114, 116 are illustrated as being resident in the memory 108. The module 110 is an identity information manager 110 in accordance with certain aspects of the present invention.

In the illustrated embodiment, the manager 110 is a set of instructions implemented by executing the instructions using the computer 102. The module 112 is an identity information storage 112 configured to store user identity information. The module 114 is an access time database 114 configured to store times at which the user accessed a resource such as a website, hereinafter referred to using the term "local login time". The module 116 is a resource time repository 116 configured to store information on the times the website was accessed, and this information is provided by the website 120, for example, by the repository 122 on the server 118. The resource login times may also be referred to hereinafter by the term "resource login time". The manager 110 is configured to compare times to ascertain whether the resource login time is less, equal to, or more than the local login time. The manager 110 is further configured to ascertain, in view of the time comparison, whether an anomaly exists indicating a potential security breach. An anomaly may exist, for example, if the local login time at which the user had accessed a resource last ("last local login time") and the resource login time at which the resource was last accessed ("last resource login time") are different. The manager 110 is configured to interact with various other modules, such as, the storage 112, the database 114, and the repository 116, among others. The manager 110 may further be configured to interact with the server 118 through the network 126, with or without user permission. For example, if the user may have an option to configure the manager 110 to automatically interact with the various modules (112, 114, 116), the server 118, or other entities not shown in the illustration of FIG. 1, as required. It is appreciated that in other embodiments, the manager 110 and the other modules 112, 114, 116 may be implemented as individual hardware components (not shown) within the computer 102. The individual hardware components may be specifically configured to provide functionalities of one or more of the modules 110, 112, 114 or 116.

Figure 2:
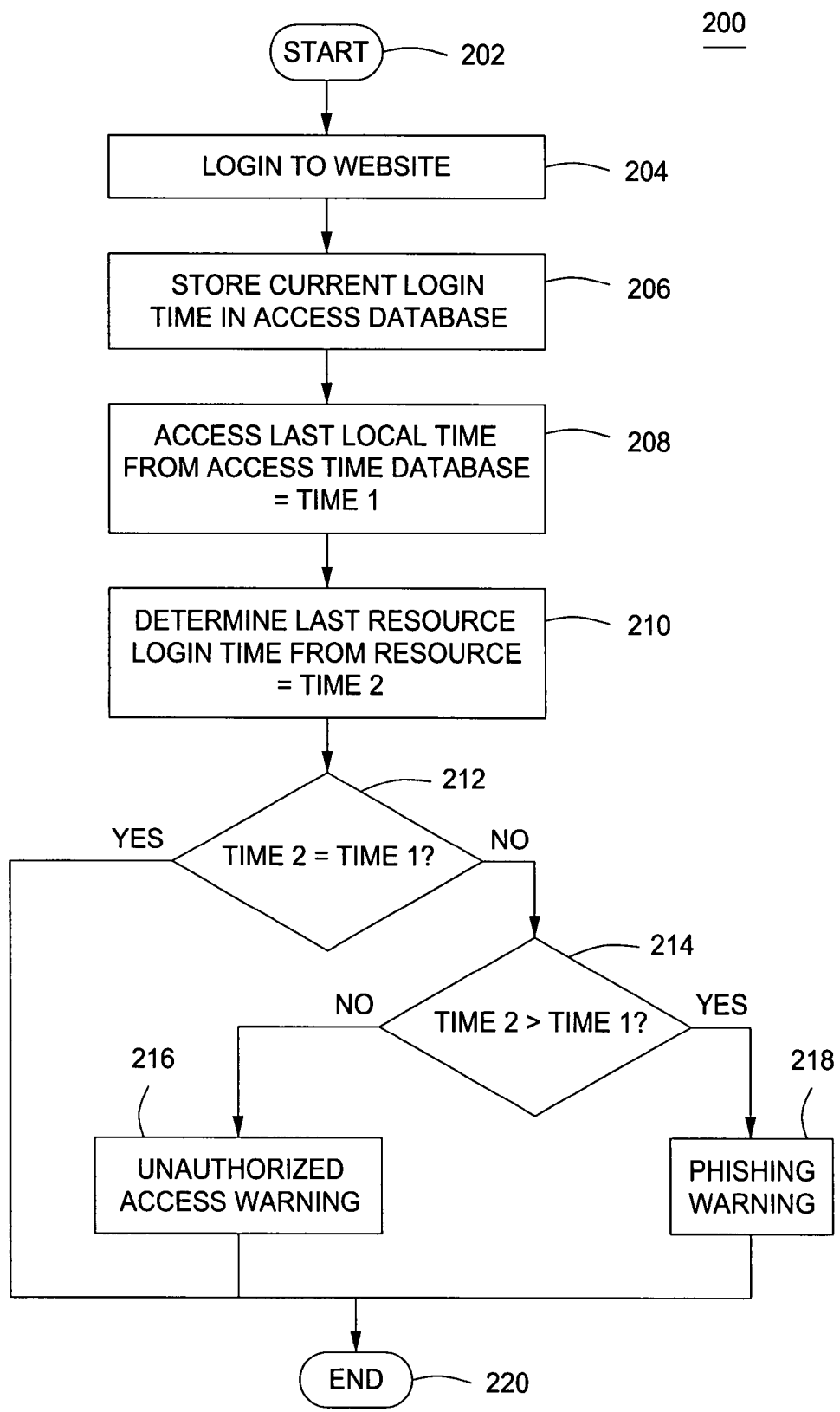
FIG. 2 is a flow chart of a method for detecting an anomaly relating a user resource access according to an embodiment of the present invention.

One embodiment of the present invention is a method for detecting an anomaly relating to resource access by a user. For example, FIG. 2 depicts a flow diagram of a method 200 for detecting an access anomaly indicating a security breach. The method 200 begins at step 202 and, at step 204, a user logs in to a resource such as a website using the user identity information. The log in may be initiated by the user, for example, from the user identity information storage 112, or directly entered by the user. According to certain embodiments, the log in may be initiated by the manager 110 using the storage 112 or by prompting the user to provide at least a portion of the relevant information.

At step 206 the time of this login to the resource is stored, for example, in the access time database 114 as current local login time, also illustrated as "Time 1" in the FIG. 2. According to various embodiments, the storing and other actions of the method 200 may be implemented by the manager 110. At step 208, the last local login time is accessed from the database 114. At step 210, a time of last login to the resource is determined for the user, from the resource, i.e., the time may be read from the website. This time may be referred to as last resource login time, also illustrated as "Time 2" in the FIG. 2. According to certain aspects, the manager 110 accesses the server 118 (FIG. 1) through the network 126, to access the repository 122 on the server 118, thereby determining the last resource login time. In other embodiments of the invention, if the resource is a website, the last login time for the particular user is recited at the website either as text or metadata.

At step 212, the last local login time is compared to the last resource login time. A decision is made at the step 212 if the last resource login time is equal to the last local login time. If the times are equal, it is ascertained that no anomaly has occurred (option "YES"), and the method 200 ends at step 220.

If however, the times are not equal, it is determined that an anomaly has occurred (option "NO"). In this case, at step 212 it is ascertained that an anomaly has occurred, the method 200 proceeds to a decision step 214. At step 214, a decision is made at the step 212 if the last resource login time is more than the last local login time. If the last resource login time is less than the last local login time (option "NO"), it is ascertained that an unauthorized access to the resource has occurred. The last resource login time being less than last local login time is most likely indicative of the fact that someone else had logged in on behalf of the user to the website, without the user's knowledge because there is no information about that authentication in the access time database 114. If the last resource login time is more than last local login time (option "YES"), it is most likely indicative of the fact that the user has been phished and the user had previously logged in to another imposter/phishing resource (not shown in the Figures) assuming that it was the intended resource 120, or it may also be indicate that the user is presently being phished, and is currently logged in to another phishing/imposter resource and not the intended resource 120. Accordingly, at step 214 the method 200, on ascertaining that the last resource login time is more than last local login time, ascertains in one embodiment that the user identity information has been phished.

According to another embodiment, upon ascertaining that the last resource login time is more than last local login time, it is ascertained that the user identity information is being phished at the current resource access. Advantageously, this embodiment also protects the users against "drive-by" pharming based phishing attacks. In a pharming attack, the phisher is attempting to determine user habits and/or identity information of any sort. Even a limited amount of identity data can be used by the phisher to limit the search algorithms used to decipher passwords and access codes to resources.

According to yet another embodiment, upon ascertaining that the last resource login time is more than last local login time the method 200 ascertains that the user identity information has either been phished or is being phished. The method 200 detects the anomalies and categorizes the anomalies appropriately, and accordingly, on detection of unauthorized resource access (option "NO"), at step 216 a warning notifying unauthorized access of the resource on user's behalf, is issued. On detection of identity information theft or phishing (option "YES"), at step 218 a warning notifying phishing of user identity information, is issued. The warning may be issued to the user, or in certain embodiments, the warning may just be noted by the manager 110. After issuing the appropriate warnings (the steps 216, 218) the method 200 ends at step 220.

On detection of any anomaly, the user may decide to change the user's authentication information, for example the password, at the resource 120. The user may also want to notify the resource owner (such as the resource administrator) of such an anomaly. According to certain embodiments, the manager 110 may suggest to the user to change the user identity information, such as the login or the password. The manager 110 may further inform, on initiation by the user or automatically, the resource 120 of a phishing attack or unauthorized access on behalf of the user.

The method 200 may be implemented by a software module, such as the identity information manager 110 of FIG. 1. Further, according to certain embodiments, the module 110 may be installable on the computer system 102 by a user. When a user accesses a specific resource, the manager 110 accesses the user identity information from the storage 112, local login time(s) from the database 114, and the resource login time(s) from repository 116 or/and repository 122, to ascertain an anomaly related to the user accessing, for example, the resource 120, in accordance with various embodiments discussed herein.

According to one embodiment, the manager 110 extracts the last login time stored at the resource automatically. This feature provides for, in an embodiment, aggressively implementing methods discussed with respect to embodiments described herein, simply by authenticating on user's behalf at predetermined intervals, for example, every day, weekly, bi-weekly, to query the last resource login time and compare with the last local login time. This could be performed, for example, by the manager 110, even though the user may not want to manually do so. In this embodiment, if an anomaly is detected, the user can be alerted and be helped to address the issue as discussed above. According to another embodiment, the manager 110 may extract one or more previous resource login times from the repository 122 and compare the resource login times with the corresponding previous local login times obtained from the database 114, thereby creating a history of any anomalies such as user identity thefts or unauthorized access on behalf of the user. In various aspects, the resource 120 stores the resource login times in a predetermined format, such that it is in a readily comprehensible form, for example, by the manager 110. if the resource is a website, the login times are generally available as text one a home page or another page defining the website, or in metadata related to the website. In some instances, the resource may be specially designed for interoperability with the invention. In such an embodiment, the resource login time would be addressable information that would be extracted by or provided to the manager 110.

While the invention has been described with reference to passwords, which are a part of the user identity information, various aspects of the invention described herein are not limited to passwords, and are similarly applicable to other elements of user identity information, or information that may be available to a malicious agent based on the misappropriation of the user identity information. All such variants are included within the scope of the present invention recited by the appended claims.

Those skilled in the art will appreciate that the methods and systems disclosed herein advantageously help users, particularly a common user, to protect their identity information against common security threats, in an advanced manner, with a high level of reliability. More particularly, the user is able to detect an access anomaly with respect to the user's access of a particular website, relatively early. The invention advantageously provides for detecting unauthorized user authentication on behalf of the user by another person or entity. The invention also provides early detection and warning of identity thefts such as through phishing attacks. Further, the present invention provides for detecting such anomalies automatically and at predetermined time intervals, which advantageously provides for alerting and protecting most users, who are not generally vigilant about such attacks.

While the foregoing is directed to embodiments of the present invention, other and further embodiments of the invention may be devised without departing from the basic scope thereof, and the scope thereof is determined by the claims that follow.

The invention claimed is:

1. A method for detecting an anomaly relating to computing resource access, the method comprising:
   logging in to a computing resource using identity information of a user;
   storing a current login time in an access time database;
   accessing a last local login time for the computing resource from the access time database;
   determining a last resource login time from the computing resource;
   comparing, using at least one computer processor, the last local login time to the last resource login time, wherein a result of the comparison indicates a resource access anomaly if the last local login time is different from the last resource login time and wherein a result of the comparison indicates no resource access anomaly if the last local login time is the same as the last resource login time;
   if the last local login time is more recent than the last resource login time, ascertaining that the resource access anomaly is that (i) a user previously provided the identity information to a different computing resource from the user's intended computing resource, and (ii) an unauthorized access has occurred previously and the identity information has been exploited without user consent; and
   if the last local login time is less recent than the last resource login time, ascertaining that the resource access anomaly is that the identity information is compromised by at least one of (i) the identity information having previously been phished when the user previously provided the identity information to the different computing resource, (ii) the identity information is presently being phished during the current login to the computing resource for the purpose of determining identity information or user habits.

2. The method of claim 1, further comprising warning the user that an identity theft may have occurred or the computing resource has had an unauthorized access if the resource last login time and the local last login time are not equivalent.

3. The method of claim 1, wherein the computing resource stores the last login time in a predetermined format.

4. The method of claim 1, further comprising automatically accessing the last resource login time stored at the computing resource.

5. The method of claim 1 wherein the computing resource is a website.

6. The method of claim 1, further comprising:
   accessing a plurality of prior local login times for the resource from the access time database;

determining a plurality of corresponding prior resource login times from the resource;
comparing, using at least one computer processor, the plurality of prior local login times to the corresponding plurality of prior resource login times; and
creating a history of anomalies based on the comparison of the plurality of prior local login times to the corresponding plurality of prior resource login times.

7. The method of claim 6, further comprising authenticating to the computing resource on behalf of the user at predetermined intervals.

8. A method for detecting an anomaly relating to website access, the method comprising:
logging in to a website using identity information of a user;
storing a current login time in an access time database;
accessing a last local login time for the website from the access time database;
determining a last website login time from the website;
comparing, using at least one computer processor, the last local login time to the last website login time, ascertaining no anomaly has occurred if the last local login time is the same as the last website login time, and ascertaining an anomaly has occurred if the last local login time is different from the last website login time;
if the last local login time is more recent than the last website login time, ascertaining that the anomaly is that (i) the user previously provided the identity information to a different website from the user's intended website, and (ii) an unauthorized access has occurred previously and the identity information has been exploited without user consent; and
if the last local login time is less recent than the last website login time, ascertaining that the anomaly is that at least one of (i) the identity information has been previously phished when the user previously provided the identity information to the different website (ii) the identity information is presently being phished during the current login to the website for the purpose of determining identity information or user habits.

9. The method of claim 8, further comprising:
accessing a plurality of prior local login times for the website from the access time database;
determining a plurality of corresponding prior website login times from the website; and
comparing, using at least one computer processor, the plurality of prior local login times to the plurality of corresponding prior website login times, ascertaining no anomaly has occurred if the last local login time is the same as the last website login time, and ascertaining an anomaly has occurred if the last local login time is different from the last website login time; and
creating a history of anomalies based on the comparison of the plurality of prior local login times to the corresponding plurality of prior website login times.

10. The method of claim 9, further comprising authenticating to the website on behalf of the user at predetermined intervals.

11. The method of claim 8, further comprising issuing a warning that an identity theft may have occurred or that the website has had an unauthorized access if the last website login time and the last local login time are different.

12. The method of claim 11, wherein issuing the warning further comprises at least one of warning the user that an identity theft may have occurred or warning the resource that an unauthorized access may have occurred.

13. The method of claim 8, further comprising automatically accessing the last login time stored at the website.

14. A system for detecting an anomaly relating to a computing resource accessed by a user, the system comprising:
an access time database stored in electronic memory configured to store a plurality of local login times at which a user logs in to the computing resource using identity information of the user;
a resource time repository configured to store a plurality of resource login times at which the user accessed the computing resource; and
an identity information manager configured to:
compare a last local login time to a last resource login time, wherein a result of the comparison indicates a resource access anomaly if the last local login time is different from the last resource login time and wherein a result of the comparison indicates no resource access anomaly if the last local login time is the same as the last resource login time;
ascertain that the resource access anomaly is that (i) the user previously provided the identity information to a different computing resource from the user's intended computing resource, and (ii) an unauthorized access has occurred previously and the identity information has been exploited without user consent, if the last local login time is more recent than the last resource login time; and
ascertain that the resource access anomaly is that the identity information is compromised by at least one of (i) the identity information having previously been phished when the user previously provided the identity information to the different computing resource, or (ii) the identity information is presently being phished during the current login to the computing resource for the purpose of determining identity information or user habits, if the last local login time is less recent than the last resource login time.

15. The system of claim 14, wherein the identity information manager is further configured to warn that an identity theft may have occurred or an unauthorized access to the resource has occurred, if the resource last login time and the local last login time are not equivalent.

16. The system of claim 14 wherein the computing resource is a website.

17. The system of claim 16 wherein the resource last login time comprises a website last login time.

18. The system of claim 14, wherein the identity information manager is further configured to:
compare a plurality of prior local login times to a corresponding plurality of prior resource login times; and
create a history of anomalies based on the comparison of the plurality of prior local login times to the corresponding plurality of prior resource login times.

19. The system of claim 18, wherein the identity information manager is further configured to authenticate on behalf of the user at predetermined intervals.

20. The system of claim 14, wherein the identity information manager is further configured to automatically access the last resource login time stored at the resource time repository.

* * * * *